(12) United States Patent  (10) Patent No.: US 8,805,977 B2
Vemulapalli et al.  (45) Date of Patent: Aug. 12, 2014

(54) METHOD AND SYSTEM FOR ADDRESS CONFLICT RESOLUTION

(75) Inventors: Jyothi Vemulapalli, Secunderabad (IN); Srinivasa R. Addepalli, San Jose, CA (US); Satya Srinivasa Murthy Nittala, Hyderabad (IN)

(73) Assignee: Freescale Semiconductor, Inc., Austin, TX (US)

( * ) Notice: Subject to any disclaimer, the term of this patent is extended or adjusted under 35 U.S.C. 154(b) by 139 days.

(21) Appl. No.: 13/156,346

(22) Filed: Jun. 9, 2011

(65) Prior Publication Data

US 2012/0317252 A1 Dec. 13, 2012

(51) Int. Cl.
*G06F 15/177* (2006.01)
*G06F 15/16* (2006.01)
*H04L 29/12* (2006.01)
*H04L 29/06* (2006.01)

(52) U.S. Cl.
CPC ......... *H04L 61/2592* (2013.01); *H04L 61/1511* (2013.01); *H04L 61/2046* (2013.01); *H04L 61/2007* (2013.01); *H04L 63/0272* (2013.01); *H04L 61/2514* (2013.01)
USPC .......................................... 709/221; 709/203

(58) Field of Classification Search
CPC .................................................. H04L 61/2535
USPC .......................................................... 709/221
See application file for complete search history.

(56) References Cited

U.S. PATENT DOCUMENTS

| | | | |
|---|---|---|---|
| 5,835,726 A | | 11/1998 | Shwed |
| 6,055,236 A | | 4/2000 | Nessett |
| 6,801,949 B1 | * | 10/2004 | Bruck et al. ................. 709/232 |
| 7,401,354 B2 | | 7/2008 | Boden |
| 7,440,754 B2 | * | 10/2008 | Bahl et al. .................. 455/432.1 |
| 7,548,967 B2 | | 6/2009 | Amyot |
| 2002/0009079 A1 | * | 1/2002 | Jungck et al. ................. 370/389 |
| 2003/0031180 A1 | * | 2/2003 | Datta et al. .................... 370/392 |
| 2006/0046709 A1 | * | 3/2006 | Krumm et al. ............. 455/422.1 |
| 2006/0281462 A1 | * | 12/2006 | Kim et al. ...................... 455/436 |
| 2007/0248085 A1 | * | 10/2007 | Volpano ........................ 370/389 |
| 2008/0162726 A1 | * | 7/2008 | Hoover et al. ................ 709/245 |
| 2009/0129354 A1 | * | 5/2009 | Gupta et al. .................. 370/338 |
| 2009/0215452 A1 | * | 8/2009 | Balasubramanian et al. 455/434 |
| 2010/0167718 A1 | * | 7/2010 | Chiussi et al. ............. 455/422.1 |
| 2010/0217655 A1 | * | 8/2010 | Kuehnel et al. .............. 705/14.4 |
| 2011/0238793 A1 | * | 9/2011 | Bedare et al. ................. 709/220 |
| 2011/0276987 A1 | * | 11/2011 | Pope et al. .................... 719/328 |

* cited by examiner

*Primary Examiner* — Gerald Smarth

(74) *Attorney, Agent, or Firm* — Charles Bergere

(57) ABSTRACT

A method and system for resolving a conflict between private internet protocol addresses assigned in a network between an internet protocol security remote access server (IRAS) and an internet protocol security remote access client (IRAC) arranged behind a network address translator (NAT) router in the network. By modifying internet key exchange version2 (IKEv2) and internet key exchange (IKE) protocol negotiations between IRAC and IRAS to include a private attribute used by IRAC to send all its internet protocol (IP) subnet addresses to IRAS, IRAS dynamically resolves any conflict of the IP addresses with that of its internal networks by mapping and assigning non-conflicting virtual IP addresses and network subnet addresses to IRAC for IRAC to access the internal networks of IRAS. The conflict resolving mechanism used in run time allows mobile virtual private networks (VPN) to access corporate networks employing IP routers implementing IP security (IPsec) remote access mechanism without access failure due to IP address conflicts.

16 Claims, 6 Drawing Sheets

```
                      1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |R|       Attribute Type      !              Length             |
 +-+-+-+-+-+-+-+-+-+-+-+-+-+-+-+-+-+-+-+-+-+-+-+-+-+-+-+-+-+-+-+-+
 |                           Subnet                              |
 +-+-+-+-+-+-+-+-+-+-+-+-+-+-+-+-+-+-+-+-+-+-+-+-+-+-+-+-+-+-+-+-+
 ~                            MASK                               ~
 +-+-+-+-+-+-+-+-+-+-+-+-+-+-+-+-+-+-+-+-+-+-+-+-+-+-+-+-+-+-+-+-+
 |                           Subnet                              |
 +-+-+-+-+-+-+-+-+-+-+-+-+-+-+-+-+-+-+-+-+-+-+-+-+-+-+-+-+-+-+-+-+
 ~                            MASK                               ~
 +-+-+-+-+-+-+-+-+-+-+-+-+-+-+-+-+-+-+-+-+-+-+-+-+-+-+-+-+-+-+-+-+
```
↗
160

FIG. 7C

```
                      1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |1|       Attribute Type      !              Length             |
 +-+-+-+-+-+-+-+-+-+-+-+-+-+-+-+-+-+-+-+-+-+-+-+-+-+-+-+-+-+-+-+-+
 |                           Subnet                              |
 +-+-+-+-+-+-+-+-+-+-+-+-+-+-+-+-+-+-+-+-+-+-+-+-+-+-+-+-+-+-+-+-+
 ~                            MASK                               ~
 +-+-+-+-+-+-+-+-+-+-+-+-+-+-+-+-+-+-+-+-+-+-+-+-+-+-+-+-+-+-+-+-+
 |                           Subnet                              |
 +-+-+-+-+-+-+-+-+-+-+-+-+-+-+-+-+-+-+-+-+-+-+-+-+-+-+-+-+-+-+-+-+
 ~                            MASK                               ~
 +-+-+-+-+-+-+-+-+-+-+-+-+-+-+-+-+-+-+-+-+-+-+-+-+-+-+-+-+-+-+-+-+
```
↗
170

FIG. 7D

METHOD AND SYSTEM FOR ADDRESS CONFLICT RESOLUTION

BACKGROUND OF THE INVENTION

The present invention relates generally to conflict resolution of a private internet protocol (IP) address in a virtual private network (VPN) using a remote access mechanism, and more particularly to conflict resolution of a private network IP address between internet protocol security remote access server (IRAS) and internet protocol security remote access client (IRAC) with IRAC being arranged behind a network address translator (NAT) in the network.

In a VPN remote access mechanism, the endpoint to security gateway tunnel deployment scenario of IP security (IPsec) VPN is implemented. Typically, the endpoint connects to a remote network such as a corporate office using an IPsec protected tunnel. The security gateway tunnel is used by the endpoint to either securely access the corporate network or to access the internet. The internet protocol (IP) address of the endpoint is not known to the security gateway prior to connection.

In such an environment, the endpoint is denoted as IPsec remote access client (IRAC). The security gateway at the corporate office is denoted as IPsec remote access server (IRAS). The IRAC requests the IRAS for an IP address associated with the security gateway to access the internal networks of the security gateway. The IP address assigned by IRAS is denoted as a virtual IP address. After connecting to IRAS, IRAC possesses two active IP addresses: the internet service provider (ISP) assigned address assigned to its physical interface; and the virtual IP address assigned by IRAS.

The IPsec remote access mechanism is explained by the following internet engineering task force (IETF) request for comments (RFC) standards: RFC 4306—Internet Key Exchange (IKEv2) Protocol; RFC 4301—Security Architecture for the Internet Protocol; RFC 2409—The Internet Key Exchange (IKE); and IETF draft document "draft-ietf-ipsec-isakmp-mode-cfg-05.txt"; and RFC 2408—Internet Security Association and Key Management Protocol (ISAKMP). As explained in the IETF documents, IRAC-IRAS data communication makes use of IPsec tunnel mode to send and receive packets. In each packet sent from IRAC, the outer IP header contains the source IP address associated with its current location. The source IP address associated with the current location is the address that will get traffic routed to IRAC directly. The inner IP header contains the source IP address assigned by IRAS. The source IP address assigned by IRAS is the virtual IP address that has traffic routed to IRAS for forwarding it to IRAC. The outer destination address is always an IP address of IRAS, while the inner destination address is the ultimate destination for the packet.

However, as the IRAC client is behind the NAT router, the IP address assigned to its physical interface might be a private IP address. If the network portion of the IP address happens to be the same as that of any of the internal networks on IRAS side, IRAC cannot access that particular remote network. For IRAC, that particular remote network appears to be directly connected to the physical interface and IRAC tries to resolve media access control (MAC) address using the address resolution protocol (ARP) for sending the packet via the physical interface instead of tunnelling the packet to IRAS.

There is a need for a method or system to solve or at least alleviate the problems discussed.

BRIEF DESCRIPTION OF THE DRAWINGS

The accompanying drawings incorporated herein and forming a part of the specification illustrate several aspects of the present invention and, together with the description, serve to explain the principles of the invention. While the invention will be described in connection with certain embodiments, there is no intent to limit the invention to those embodiments described. On the contrary, the intent is to cover all alternatives, modifications and equivalents as included within the scope of the invention as defined by the appended claims. In the drawings:

FIG. 7C is a schematic payload format diagram of all IP subnets to IRAS from IRAC in IKEv2 configuration attribute payload in accordance with an embodiment of the invention;

FIG. 7D is a schematic payload format diagram of all IP subnets to IRAS from IRAC in IKE as a data attribute in attribute payload in accordance with an embodiment of the invention;

DETAILED DESCRIPTION OF THE INVENTION

Figure 1:
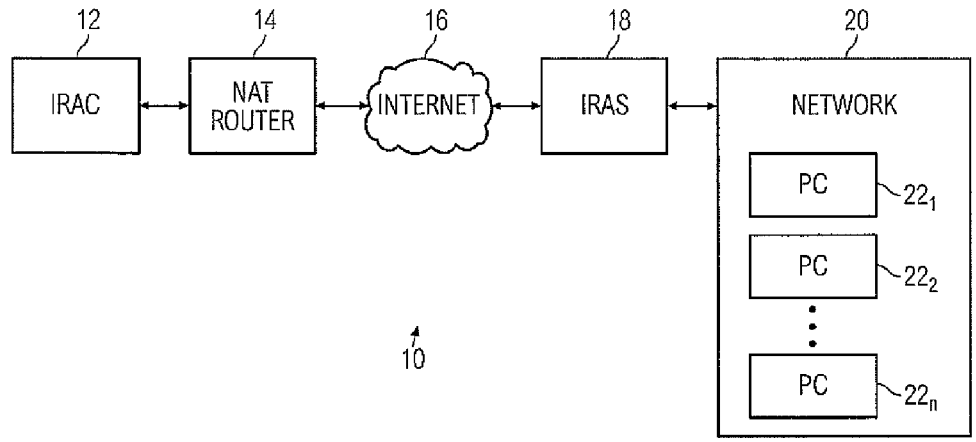
FIG. 1 is a block diagram of an internet protocol security remote access client (IRAC)-internet protocol security remote access server (IRAS) system with network address translator (NAT) in accordance with an embodiment of the invention.

An aspect of the invention is a method for resolving conflict between addresses assigned in an internet protocol (IP) remote access system between a client and an internal network via a server connected to the client via an external communication network, the client being arranged behind a network address translation (NAT) router, the method comprises receiving a request from the client to the server for a virtual IP address to communicate with the internal networks of the server along with IP address information of the client for conflict resolution; comparing the IP address information of the client with a plurality of internal network addresses of the internal networks of the server for any conflicts of addresses to determine conflicted internal network addresses; assigning a conflict resolving network address for each conflicted internal network address conflicting with the IP address information of the client; mapping each conflicted network address of the internal network of the server to the assigned conflict resolving network address for the client; and sending a reply with the assigned conflict resolving network addresses and non-conflicting virtual IP address to the client for enabling communication between the client and the internal network via the server.

In an embodiment, the NAT router is connected to the client for communication with the server via the external communication network. The conflict resolving module on the server (IRAS) performs the mapping of each conflicted internal network address of the internal network of the server to each assigned respective conflict resolving network address for the client. The client communicates to the internal networks on the server using the conflict resolving network addresses. NAT module of the server is used to translate the conflict resolving network addresses to the original internal network IP addresses.

In an embodiment, the client and server employ the internet key exchange (IKE) protocol for IP security (IPSec) tunnel establishment. The request sent from the client to the server comprises of a private attribute containing the IP address information of the client in an attribute payload. The reply sent from the server to the client comprises of the assigned conflict resolving network addresses as subnet addresses in an attribute payload. This new private attribute is sent in an attribute payload along with the internet security association key management protocol (ISAKMP) header as specified in the IETF documents.

In an embodiment, the client and server employ the internet key exchange version 2 (IKEv2) for IP security (IPSec) tunnel establishment. The request sent from the client to the server comprises of a private attribute containing the IP address information of the client in a configuration payload (CP). The reply sent from the server to the client comprises the assigned conflict resolving network addresses as subnet addresses in a configuration payload (CP) of type reply. This private attribute is sent along with IKEv2 header and CP request payload as specified in the IETF documents.

An aspect of the invention is a system for resolving conflict between addresses assigned in the system, the system is an internet protocol (IP) remote access system comprising a client and a server, the client connected with the server via an external communication network; an internal network connected to the server, the internal network comprising a plurality of internal network addresses, and the client in communication with the internal network via the server; and a network address translator (NAT) router connected to the client for communication with the server via the external communication network; the client having IP address information, and the client comprising a send and request module for sending a request to the server for a virtual IP address together with the IP address information of the client for conflict resolution; the server comprising a conflict resolution module for receiving the request from the client, comparing the IP address information of the client with the plurality of internal network addresses of the internal network of the server for any conflicts of addresses to determine conflicted internal network addresses, assigning a respective conflict resolving network address for each conflicted internal network address conflicting with the IP address information of the client, mapping each conflicted internal network address of the internal network of the server to each assigned respective conflict resolving network address for the client, and sending a reply with the assigned conflict resolving network addresses and non-conflicting virtual IP addresses to the client for enabling communication between the client and the internal network via the server.

In an embodiment the server (IRAS) comprises a NAT module for mapping each conflicted internal network address of the internal network of the server to each assigned respective conflict resolving network address for the client in data communication between the internal network and the client.

In an embodiment, the server may comprise of a domain name server-application level gateway (DNS-ALG) module for mapping the original internal network IP address information to the assigned conflict resolving network addresses in DNS messages destined to the client. The client is an internet protocol security remote access client (IRAC) and the server is an internet protocol security remote access server (IRAS).

An aspect of the invention is a server for resolving conflict between addresses assigned in an internet protocol (IP) remote access system, the system comprising a client having IP address information connected with the server via an external communication network; an internal network connected to the server, the internal network comprising a plurality of internal network addresses, and the client in communication with the internal network via the server; and a network address translator (NAT) router connected to the client for communication with the server via the external communication network; the server comprising a conflict resolution module for receiving a request from the client for a virtual IP address together with the IP address information of the client for conflict resolution, comparing the IP address information of the client with the plurality of internal network addresses of the internal network of the server for any conflicts of addresses to determine conflicted internal network addresses, assigning a respective conflict resolving network address for each conflicted internal network address conflicting with the IP address information of the client, mapping each conflicted internal network address of the internal network of the server to each assigned respective conflict resolving network address for the client, and sending a reply with the assigned conflict resolving network address and non-conflicting virtual IP address to the client for enabling communication between the client and the internal network via the server.

A method and system is disclosed for resolving a conflict between private internet protocol (IP) addresses assigned in a network between internet protocol security remote access server (IRAS) and internet protocol security remote access client (IRAC) arranged behind a network address translator (NAT) in the network. In an embodiment, by modifying internet key exchange version two (IKEv2) protocol negotiations, any conflict between assigned IP addresses is resolved. Specifically, the IKEv2 packets sent between IRAC and IRAS include an attribute used by IRAC to send all the IRAC internet protocol (IP) subnets to IRAS. IRAS dynamically resolves any conflict by mapping and assigning a non-conflicting virtual IP address and network subnet addresses. Such a mechanism allows mobile virtual private networks (VPN) to access corporate networks employing IP routers employing IP security (IPsec) remote access mechanisms without access failure.

FIG. 1 is a block diagram of an internet protocol security remote access client (IRAC)-internet protocol security remote access server (IRAS) communication system 10 with network address translator (NAT) in accordance with an embodiment of the invention. The IRAC-IRAS communication system 10 shown comprises IRAC 12 connected to a NAT router 14 to access the internet 16, IRAS 18 and network 20. The network 20 may be a secure network such as a corporate network that comprises a number of personal computers (PC) $22_1, 22_2 \ldots 22_n$. The block diagram 10 shows the IRAC-IRAS deployment scenario with the IRAC arranged behind a NAT router. In this scenario, the IP address as seen by the security gateway/IRAS will not be the same as the IP address of the protected endpoint (IRAC), and packets are user datagram protocol (UDP) encapsulated in order to be routed properly. In this deployment, IRAC accesses the machines "host" and the "DNS Server" belonging to the corporate network in a secure fashion. As the IRAC client is behind the NAT router, the IP address assigned to the physical interface of the IRAC might be a private IP address. An example of this scenario is when an onsite marketing engineer is accessing the corporate network remotely from a customer's premises or when a corporate employee is accessing the corporate network remotely from the employee's home securely. An example that involves the conflict may be where the corporate network and the Physical IP address of the IRAC belong to the same subnet 192.168.20.0/24:
IRAC physical IP: 192.168.20.230;
IRAC virtual IP: 192.168.10.25;
SGW IP: 202.20.10.23; and
Corporate network: 192.168.20.0/24.

Another issue is that IRAS publishes the IP addresses of DNS and WINDOWS internet name service (WINS) servers to IRAC as part of internet key exchange (IKE)/IKEv2 negotiation. These IP addresses may conflict with the network portion of any of the IRAC IP addresses. If there is a conflict, IRAC cannot access these servers. WINDOWS is a trademark of Microsoft Corporation of Redmond, Wash., United States of America.

Another issue is that IRAS assigns virtual private IP address(es) to IRAC as part of IKE/IKEv2 negotiation. IRAC makes use of this virtual IP Address as the source IP of the inner IP header while communicating with any of the allowed internal networks of IRAS. If the virtual IP address assigned is the same as the IP address of any of the physical interfaces on IRAC then IRAC fails to access any of the allowed internal networks of IRAS. If the network portion of the virtual IP address is the same as the network portion of any of the physical interfaces of IRAC, then IRAC fails to communicate with the host machine whose IP address is the same as that of the virtual IP address.

Figure 2:
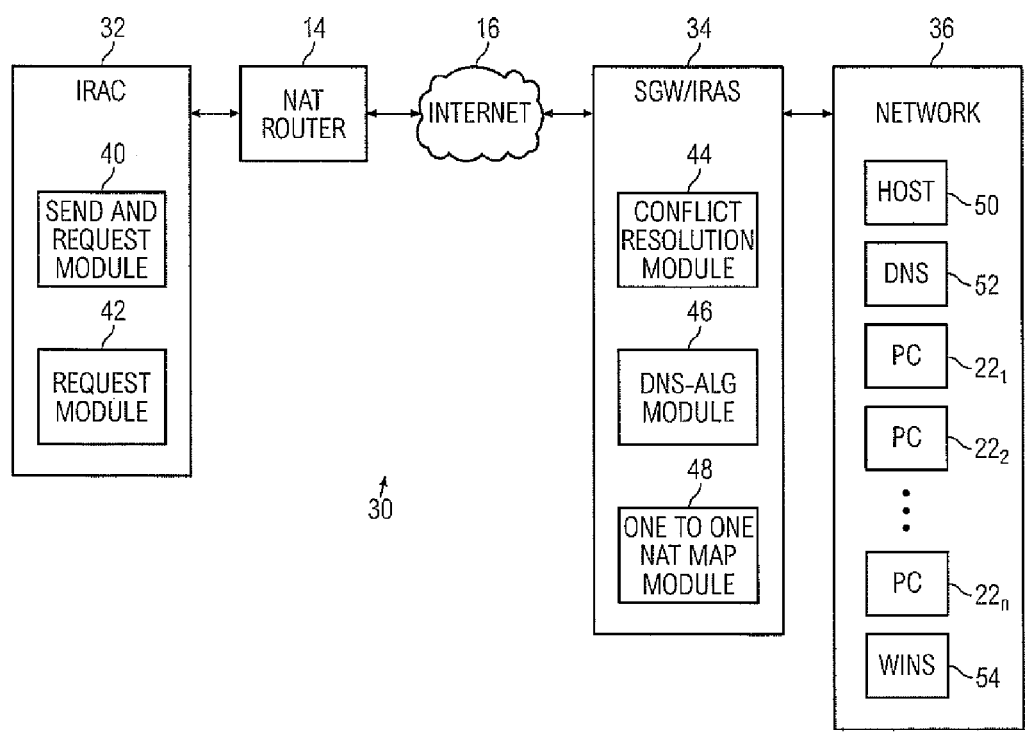
FIG. 2 is a block diagram of an IRAC-IRAS system of FIG. 1 with the host belonging to IRAS internal network and security gateway (SGW) acting as IRAS, domain name server (DNS), and conflict resolution modules in accordance with an embodiment of the invention.

To address the above issues, the IRAC-IRAS negotiations and functionality are modified in a dynamic fashion in accordance with an embodiment of the invention. FIG. 2 is a block diagram of an IRAC-IRAS system 30 with host and security gateway (SGW), domain name server (DNS), and conflict resolution modules in accordance with an embodiment of the invention. The IRAC-IRAS communication system 30 shown comprises additional components and modules within IRAC 32, security gateway (SGW)/IRAS 34, and internal network 36. IRAC 32 comprises a send and request module 40 and a request module 42. SGW/IRAS 34 comprises a conflict resolution module 44, domain name server-application level gateway (DNS-ALG) module 46, one to one NAT map module 48. In addition to PC $22_1, 22_2 \ldots 22_n$, network 36 comprises host 50, domain name server (DNS) 52 and WINS 54.

Figure 3:
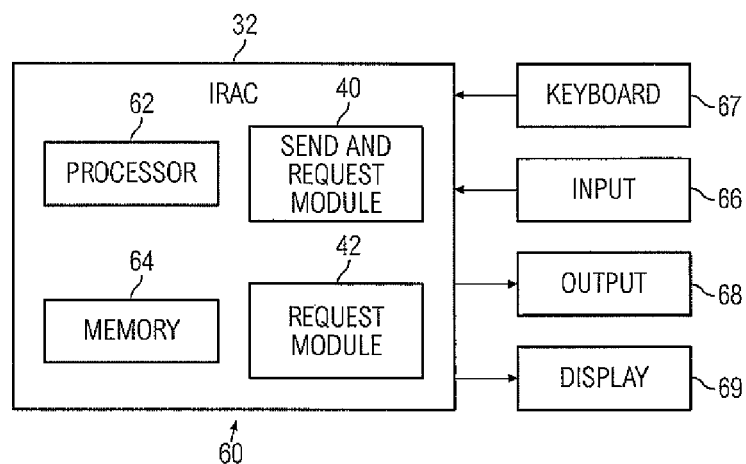
FIG. 3 is a block diagram of an IRAC of FIG. 2 shown in more detail in accordance with an embodiment of the invention.

FIG. 3 is a block diagram 60 of an IRAC 32 of FIG. 2 shown in more detail in accordance with an embodiment of the invention. IRAC 32 comprises send and request module 40 and request module 42 with a processor 62 and memory 64, together with input 66, such as keyboard 67, and output 68, such as display 69, to process the information received and sent from the IRAC 32. The request module 42 is for preparing the request to be sent to IRAS. The send and request module 40 is for sending a request to the SGW/IRAS 34 containing internet protocol (IP) subnet addresses of IRAC together with a request for a virtual address from IRAS, and receiving the requested virtual IP address and the IP subnet information of the accessible internal networks of IRAS from IRAS.

Figure 4:
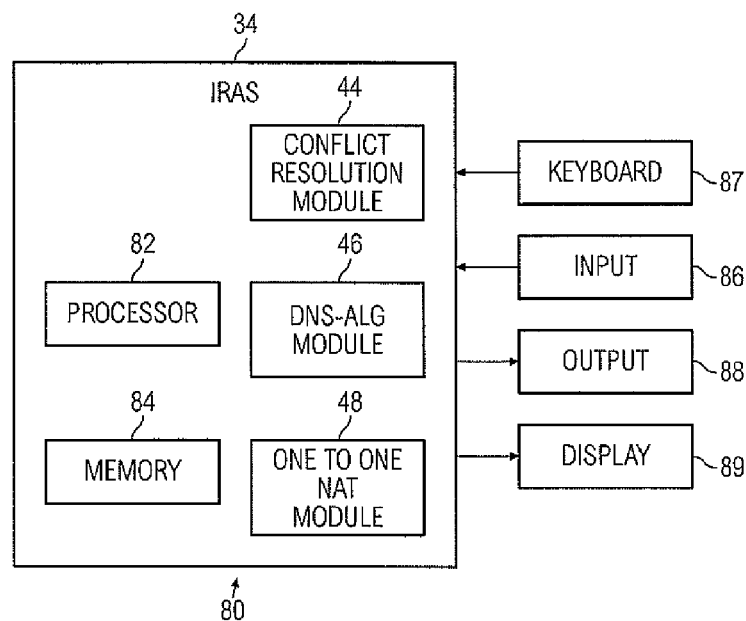
FIG. 4 is a block diagram of an IRAS of FIG. 2 shown in more detail in accordance with an embodiment of the invention.

FIG. 4 is a block diagram 80 of an IRAS 34 of FIG. 2 shown in more detail in accordance with an embodiment of the invention. IRAS 34 comprises of conflict resolution module 44, DNS-ALG module 46, one to one NAT module 48 for run time mapping, a processor 82 and memory 84, together with input 86, such as keyboard 87, and output 88, such as display 89, to process the information received and sent from IRAS 34. The conflict resolution module 44 is for receiving the request for a virtual address along with the IP subnets from the IRAC, comparing the IP subnets of the IRAC with the internal network addresses, and assigning a virtual address to the IRAC, mapping the conflicted internal network subnet addresses to the conflict resolving network subnet addresses, and sending the assigned conflict resolving network subnet addresses along with the assigned virtual address to the IRAC for secure remote communication between IRAC 32 and the internal network 36. The one to one NAT module 48 maps between the original subnet addresses of the internal network and the assigned conflict resolving network subnet addresses. The DNS-ALG module 46 translates the original IP addresses of the internal network to the assigned conflict resolving network IP addresses in DNS messages. In this embodiment, the handling of conflicting addresses is dynamically resolved, and the handling of non-conflicting addresses is not affected by this embodiment and takes the normal course of action as mentioned by IKEv2/IKE and IPSec protocols.

Figure 5:
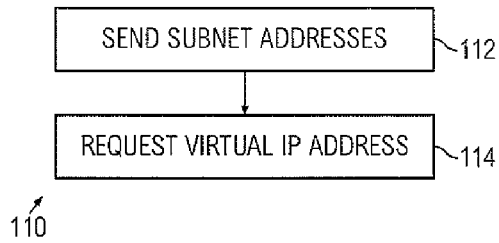
FIG. 5 is a process flow chart of communication method at IRAC of FIG. 3 in accordance with an embodiment of the invention.

FIG. 5 is a process flow chart 110 of communication method at IRAC 32 of FIG. 3 in accordance with an embodiment of the invention. The method at IRAC 32 comprises sending IP subnet addresses 112 to IRAS, and request virtual internet protocol (IP) address 114.

Figure 6:
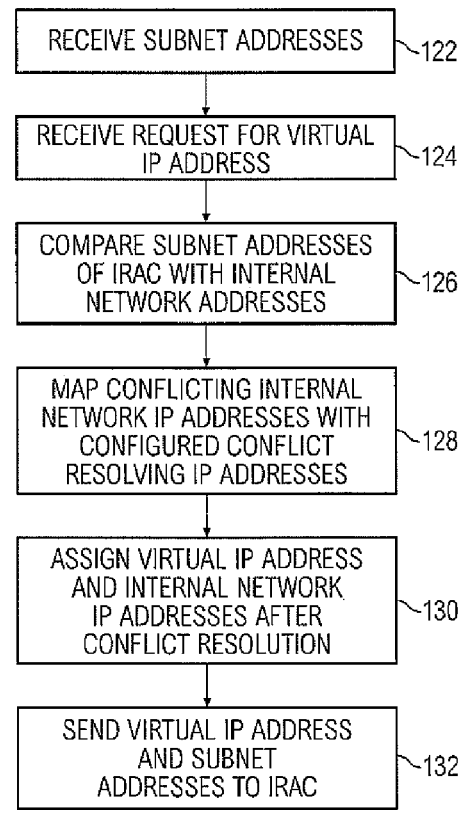
FIG. 6 is a process flow chart of communication method at IRAS of FIG. 4 in accordance with an embodiment of the invention.

FIG. 6 is a process flow chart 120 of communication method at IRAS 34 of FIG. 4 in accordance with an embodiment of the invention. The method at IRAS 34 comprises receiving subnet addresses 122 from IRAC 32, receiving request for virtual IP address 124 from IRAC 32, and compare 126 subnet addresses of IRAC 32 with addresses of the internal network 36. If any matched addresses are found, IRAS 34 maps them to conflict resolving network addresses 128, to assign 130 virtual IP address and conflict resolving network addresses and send 132 the virtual IP address and the conflict resolving network addresses as internal network subnet addresses to IRAC. The conflicting addresses along with the mapped conflict resolving addresses are provided to one to one NAT module 48 for run time mapping.

This mechanism uses a private attribute type (16385). This attribute type is used by IRAC to send all of the IP subnets information of IRAC physical interfaces to IRAS in the IKEv2 configuration request payload or IKE transaction exchange message along with other standard information from IRAC.

In addition, IRAS is configured with conflict resolving network information. This conflict resolving network information comprises of a given number of subnets which can be used for resolving the conflicts. For example, the following subnets 192.168.40.0/24, 192.168.50.0/24, 192.168.60.0/24 may be used in the example provided above.

In an embodiment, to ensure the conflict is resolved, IRAS checks if any of the internal network information of IRAS is conflicting with any of the received IRAC physical interface subnets. If there is a conflict, IRAS picks up one of the non-conflicting subnet information from the configured conflict resolving network information and is sent in the response from IRAS to IRAC. IRAC uses this information to access that particular IRAS internal network. For example, such a configuration may be 192.168.40.0/24, and IRAS internal network continues to possess the same original network information and the internal machines use the same addresses. For example, such a configuration may be 192.168.20.0.

For each IRAC client identified by the assigned virtual IP Address, IRAS maintains one to one mapping of the selected conflict resolving network information and the originally configured network information for all the conflicting internal networks. This mapping is done by using network address translation (one-to-one NAT) module procedure for subnets. In one example:
  IRAC virtual IP address (VIP) may be 192.168.10.25;
  conflict resolving subnet along with the mask may be 192.168.40.0/24; and
  original subnet along with the mask may be 192.168.20.0/24.

The data packet flow changes are explained. The packets flowing from the conflicting internal network of IRAS to IRAC involves IRAS module mapping the source IP addresses of the packets from the originally configured network into the conflict resolving network information for the given IRAC client identified by the virtual IP which is used as the destination IP address of the packet. This is performed by IRAS module with the help of one to one NAT module.

The packets flowing from IRAC to the conflicting internal network of IRAS involves IRAS module mapping the destination IP addresses of these packets from the conflict resolving network information into the originally configured network information for the given IRAC client identified by the virtual IP which is used as the source IP address of the inner IP header. This is performed by IRAS module with the help of one to one NAT module.

Figure 7A:
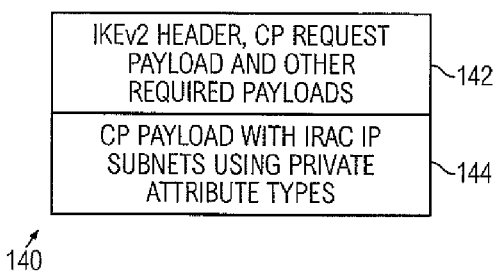
FIG. 7A is a simplified schematic packet/payload diagram of information sent from IRAC of FIG. 3 to IRAS of FIG. 4 using IKEv2 protocol in accordance with an embodiment of the invention.

FIG. 7A is a simplified schematic packet/payload diagram 140 of information sent from IRAC 32 of FIG. 3 to IRAS 34 of FIG. 4 in accordance with an embodiment of the invention. The packet/payload diagram 140 shows the IKEv2 header and configuration request payload (CP) 142, and CP payload 144 with IRAC IP subnets using private attribute. All the IP subnets from IRAC 32 to IRAS 34 are sent in configuration attribute payload using private attribute type (16385) when IKEv2 is used. The payload format is shown in FIG. 7C, where the data in the attribute payload contains the subnet and mask pairs.

Figure 7B:
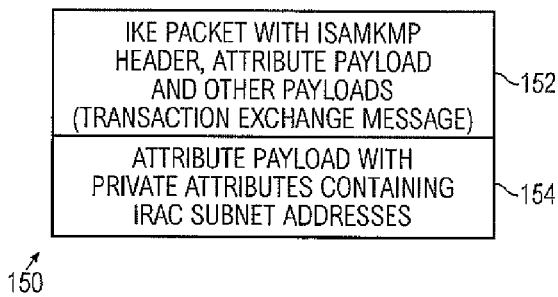
FIG. 7B is a simplified schematic packet/payload diagram of all internet protocol (IP) subnet information sent from IRAC of FIG. 3 to IRAS of FIG. 4 using IKE protocol in accordance with an embodiment of the invention.

FIG. 7B is a simplified schematic packet/payload diagram 150 of all internet protocol (IP) subnet information sent from IRAC of FIG. 3 to and IRAS of FIG. 4 in accordance with an embodiment of the invention. The packet/payload diagram 150 shows the IKE packet with internet security association and key management protocol (ISAKMP) header, attribute payloads, and other payloads in transaction exchange message 152. All the IP subnets sent from IRAC 32 to IRAS 34 are sent in private attribute of attribute payload 154 in IKE transaction exchange message along with other standard information. The payload format is shown in FIG. 7D.

FIG. 7C is a schematic payload format diagram 160 of all IP subnets to IRAS from IRAC in IKEv2 configuration attribute payload in accordance with an embodiment of the invention.

FIG. 7D is a schematic payload format diagram 170 of all IP subnets to IRAS from IRAC in IKE as a private attribute in attribute payload in accordance with an embodiment of the invention.

Figure 8A:
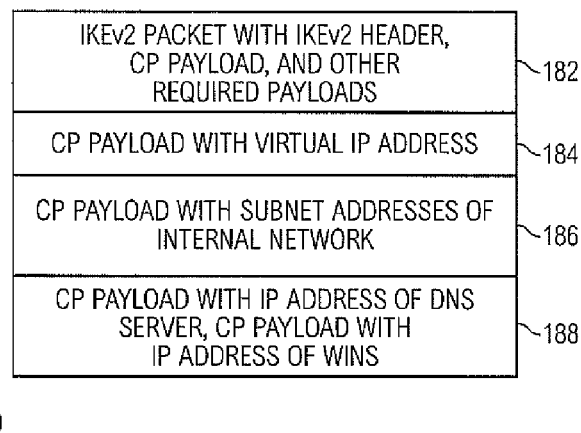
FIG. 8A is a simplified schematic packet/payload diagram of information sent from IRAS of FIG. 4 to IRAC of FIG. 3 using IKEv2 protocol in accordance with an embodiment of the invention.

FIG. 8A is a simplified schematic packet/payload diagram 180 of information sent from IRAS of FIG. 4 to and IRAC of FIG. 3 in accordance with an embodiment of the invention using IKEv2 protocol. The packet/payload diagram 180 shows the IKEv2 header, CP payload and other required payloads 182, the CP payload consists of virtual IP addresses 184, subnet addresses of the internal network 186, IP address of the DNS server and IP address of WINS 188.

Figure 8B:
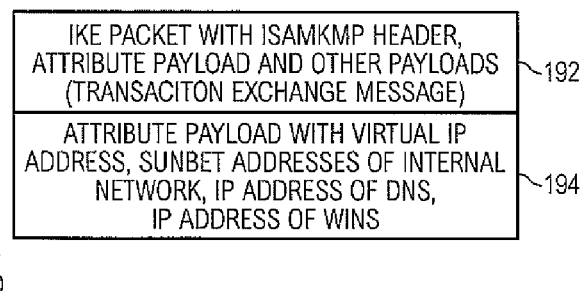
FIG. 8B is a simplified schematic packet/payload diagram of information sent from IRAS of FIG. 4 to IRAC of FIG. 3 using IKE protocol in accordance with an embodiment of the invention.

FIG. 8B is a simplified schematic packet/payload diagram 190 of information sent from IRAS of FIG. 4 to and IRAC of FIG. 3 in accordance with an embodiment of the invention using IKE protocol. The packet/payload diagram 190 shows IKE packet with ISAMKMP header, attribute payload and other payloads (in transaction exchange message) 192, and attribute payload consisting of virtual IP address, subnet addresses of internal network, IP address of DNS and IP address of WINS 194.

It will be appreciated that applications on IRAC may use domain names to access IRAS internal networks. IRAS normally provides a DNS server IP address to IRAC as part of the negotiation. DNS proxy on the IRAC makes use of the DNS server to resolve the requested domain names to IP addresses.

An administrator may configure domain names of its internal networks with the local DNS server (at IRAS internal network). While doing so, the administrator always registers with the originally configured network information. So the requests for domain name resolution resolve to originally configured network information rather than the conflict resolving network information. Due to this issue, applications on IRAC fail to access the internal networks on the IRAS.

In order to avoid such an issue, a DNS-application level gateway (ALG) is employed on the IRAS side. The following IP address values are to be programmed by IRAS to DNS-ALG module for each of the IRAC clients for which the above conflict is detected involving one or more internal networks of IRAS. The destination IP, i.e. virtual IP address assigned to IRAC client, IP subnets to be replaced in the DNS response (originally configured network information) and IP subnets to replace with (the conflict resolving network information) are to be programmed. The DNS-ALG module maintains such configured records in a table.

IP subnets to replace with belong to the conflict resolving network information and are selected as part of the conflict resolution during IRAS-IRAC negotiation for the given internal network. The ALG intercepts the DNS responses from the DNS server, and identifies the DNS responses to be modified with the help of the configured table by using the destination IP and the IP to be replaced with the fields of the table. The ALG replaces the resolved IP address in the DNS server response (IP to be replaced) with the IP address to replace.

It will be appreciated that, in the issue that IRAS publishes the IP addresses of DNS and WINS servers to IRAC as part of IKE/IKEv2 negotiation, and the IP addresses may conflict with the network portion of any of the physical interfaces on IRAC, such that if there is a conflict, IRAC cannot access these servers. Such an issue is resolved when IRAS checks IP addresses of DNS and WINS servers with the network portion of received IP addresses of the IRAC physical interfaces. If there is a conflict, the original IP address is mapped to the conflict resolving network IP address and the mapped IP address is published to IRAC. This mapping is done as explained above.

It will be appreciated that, in the issue that IRAS assigns virtual private IP address(s) to IRAC as part of IKE/IKEv2 negotiation, and where IRAC makes use of this virtual IP address as the source IP of the inner IP header while communicating with any of the allowed internal networks of IRAS, if the virtual IP address assigned is the same as the IP address of any of the physical interfaces on IRAC then IRAC fails to access any of the allowed internal networks of IRAS, and if the network portion of the virtual IP address is the same as the network portion of any of the physical interfaces of IRAC, then IRAC fails to communicate with the host machine whose IP address is the same as that of the virtual IP address. Such an issue is resolved when IRAS implements an additional check to avoid the problem. IRAS selects the virtual IP address for assignment to IRAC such that it is not in conflict with any of the IRAC physical interface subnets received during negotiation, i.e., it is not part of any of those subnets.

Additionally, it will be appreciated that these problems can indeed be avoided by manually checking before assigning IP addresses at both IRAC and IRAS which is neither practical nor feasible as it requires out of band communication.

The devices and subsystems of the exemplary methods and systems described with respect to any of the FIGS. 1-8 can communicate, for example, over a communication network 16 such as the internet as shown in FIG. 1 and FIG. 2, and can include any suitable servers, workstations, personal computers (PCs), laptop computers, handheld devices, with visual displays and/or monitors, telephones, cellular telephones, wireless devices, PDAs, Internet appliances, set top boxes, modems, other devices, and the like, capable of performing the processes of the disclosed exemplary embodiments. The devices and subsystems, for example, may communicate with each other using any suitable protocol and may be implemented using a general-purpose computer system and the like. One or more interface mechanisms may be employed, for example, including Internet access, telecommunications in any suitable form, such as voice, modem, and the like, wireless communications media, and the like. Accordingly, communication network may include, for example, wireless communications networks, cellular communications network, public switched telephone networks (PSTNs), packet data networks (PDNs), the internet, intranets, hybrid communications networks, combinations thereof, and the like.

It is to be understood that the embodiments, as described with respect to any of the FIGS. 1-8, are for exemplary purposes, as many variations of the specific hardware used to implement the disclosed exemplary embodiments are possible. For example, the functionality of the devices and the subsystems and modules of the embodiments may be implemented via one or more programmed computer system or devices. To implement such variations as well as other variations, a single computer system may be programmed to perform the functions of one or more of the devices and subsystems and modules of the exemplary systems. On the other hand, two or more programmed computer systems or devices may be substituted for any one of the devices and subsystems or modules of the exemplary systems. Accordingly, principles and advantages of distributed processing, such as redundancy, replication, and the like, also may be implemented, as desired, for example, to increase robustness and performance of the exemplary systems described with respect to any of the FIGS. 1-8.

The exemplary systems described with respect to FIGS. 1-8 may be used to store information relating to various processes described herein. This information may be stored in one or more memories, such as hard disk, optical disk, magneto-optical disk, RAM, and the like, of the devices and sub-systems of the embodiments. One or more databases of the devices and subsystems may store the information used to implement the exemplary embodiments. The databases may be organized using data structures, such as records, tables, arrays, fields, graphs, trees, lists, and the like, included in one or more memories, such as the memories listed above.

All or a portion of the exemplary systems described with respect to any of the FIGS. 1-8B may be conveniently implemented using one or more general-purpose computer systems, microprocessors, digital signal processors, micro-controllers, and the like, programmed according to the teachings of the disclosed exemplary embodiments. Appropriate software may be readily prepared by programmers of ordinary skill based on the teachings of the disclosed exemplary embodiments. In addition, the exemplary systems may be implemented by the preparation of application-specific integrated circuits or by interconnecting an appropriate network of component circuits.

While there has been described in the foregoing description embodiments of the invention, it will be understood by those skilled in the technology concerned that many variations or modifications in details of design or construction may be made without departing from the scope of the present invention as defined by the appended claims. The embodiments of the invention have been described herein, including the best mode known to the inventors for carrying out the invention. Variations of the preferred embodiments may become apparent to those of ordinary skill in the art upon reading the foregoing description. The inventors expect skilled artisans to employ such variations as appropriate, and the inventors expect the invention may be practiced other than as specifically described herein. However, the description of the invention is intended to include all modifications and equivalents of the subject matter recited in the claims appended hereto as permitted by the applicable law. Moreover, any combination of the above-described elements in all possible variations thereof is encompassed by the invention unless otherwise indicated herein or otherwise clearly contradicted by context.

The invention claimed is:

1. A method for resolving conflict between addresses assigned in an internet protocol (IP) remote access system between a client and an internal network via a server connected to the client via an external communication network, the client being arranged behind a network address translation (NAT) router, the method, carried out by the server, comprising:
   receiving a request from the client for a virtual IP address to communicate with the internal networks of the server along with IP address information of the client for conflict resolution;
   comparing the IP address information of the client with a plurality of internal network addresses of the internal networks of the server for any conflicts of addresses to determine conflicted internal network subnet addresses;
   assigning a conflict resolving network subnet address for each conflicted internal network subnet address conflicting with the IP address information of the client;
   mapping each conflicted internal network subnet address of the internal network of the server to the assigned conflict resolving network subnet address for the client; and
   sending a reply with the assigned conflict resolving network subnet addresses and non conflicting virtual IP address to the client for enabling communication between the client and the internal network via the server,
   wherein the client is an internet protocol security remote access client (IRAC) and the server is an internet protocol security remote access server (IRAS), and the client and server use internet key exchange version 2 (IKEv2) for IP security (IPSec) tunnel establishment.

2. The method of claim 1, wherein the NAT router is connected to the client for communication with the server via the external communication network, and mapping of each conflicted internal network subnet address of the internal network of the server to each assigned respective conflict resolving network subnet address for the client is performed in a conflict resolving module of the server.

3. The method of claim 1, wherein the client and server communicate with internet key exchange (IKE) protocol for IP security (IPSec) tunnel establishment.

4. The method of claim 3, wherein the request sent from the client to the server comprises a private attribute containing the IP address information of the client in an attribute payload.

5. The method of claim 3, wherein the reply sent from the server to the client comprises the assigned conflict resolving subnet network addresses in an attribute payload.

6. The method of claim 1, wherein the request sent from the client to the server comprises a private attribute containing the IP address information of the client in a configuration payload (CP).

7. The method of claim 1, wherein the reply sent from the server to the client comprises the assigned conflict resolving network subnet addresses in a configuration payload (CP) of type reply.

8. A system for resolving conflict between addresses assigned in the system, wherein the system is an internet protocol (IP) remote access system comprising:
a client and a server, the client connected with the server via an external communication network;
an internal network connected to the server, the internal network comprising a plurality of internal network addresses, and the client in communication with the internal network via the server; and
a network address translator (NAT) router connected to the client for communication with the server via the external communication network;
the client having IP address information, and the client comprising a send and request module for sending a request to the server for a virtual IP address together with the IP address information of the client for conflict resolution;
the server comprising a conflict resolution module for receiving the request from the client, comparing the IP address information of the client with the plurality of internal network addresses of the internal network of the server for any conflicts of addresses to determine conflicted internal network subnet addresses, assigning a respective conflict resolving network subnet address for each conflicted internal network subnet address conflicting with the IP address information of the client, mapping each conflicted internal network subnet address of the internal network of the server to each assigned respective conflict resolving network subnet address for the client, and sending a reply with the assigned conflict resolving network subnet address and non-conflicting virtual IP address to the client for enabling communication between the client and the internal network via the server,
wherein the client is an internet protocol security remote access client (IRAC) and the server is an internet protocol security remote access server (IRAS), and the client and server use internet key exchange version 2 (IKEv2) for IP security (IPSec) tunnel establishment.

9. The system of claim 8, wherein the server comprises of a one to one NAT module for mapping each conflicted internal network subnet address of the internal network of the server to each assigned respective conflict resolving network subnet address for the client in data communication between the client and the internal network.

10. The system of claim 8, wherein the server further comprises a domain name server (DNS)—application level gateway (ALG) module for mapping the original internal network IP address information to the assigned conflict resolving network subnet addresses in DNS response messages destined to the client.

11. The system of claim 8, wherein the client and server communicate with internet key exchange (IKE) protocol for IP security (IPSec) tunnel establishment.

12. The system of claim 11, wherein the request sent from the client to the server comprises a private attribute containing the IP address information of the client in an attribute payload.

13. The system of claim 11, wherein the reply sent from the server to the client comprises the assigned conflict resolving network subnet addresses in an attribute payload.

14. The system of claim 8, wherein the request sent from the client to the server comprises a private attribute containing the IP address information of the client.

15. The system of claim 8, wherein the reply sent from the server to the client comprises the assigned conflict resolving network subnet addresses in a configuration payload (CP) of type reply.

16. A server for resolving conflicts between addresses assigned in an internet protocol (IP) remote access system, the system including:
a client having IP address information connected with the server via an external communication network;
an internal network connected to the server, the internal network comprising a plurality of internal network addresses, wherein the client is in communication with the internal network via the server; and
a network address translator (NAT) router connected to the client for communication with the server via the external communication network;
the server comprising:
a conflict resolution module for receiving a request from the client for a virtual IP address together with the IP address information of the client for conflict resolution, comparing the IP address information of the client with the plurality of internal network addresses of the internal network of the server for any conflicts of addresses to determine conflicted internal network subnet addresses, assigning a respective conflict resolving network subnet address for each conflicted internal network subnet address conflicting with the IP address information of the client, mapping each conflicted internal network subnet address of the internal network of the server to each assigned respective conflict resolving network subnet address for the client, and sending a reply with the assigned conflict resolving network subnet address and non-conflicting virtual IP address to the client for enabling communication between the client and the internal network via the server,
wherein the client is an internet protocol security remote access client (IRAC) and the server is an internet protocol security remote access server (IRAS), and the client and server use internet key exchange version 2 (IKEv2) for IP security (IPSec) tunnel establishment.

* * * * *